(12) United States Patent
Janecek

(10) Patent No.: US 7,989,084 B2
(45) Date of Patent: Aug. 2, 2011

(54) POWDERED METAL MANUFACTURING METHOD AND DEVICES

(75) Inventor: Thomas Janecek, Flagstaff, AZ (US)

(73) Assignee: Motor Excellence, LLC, Flagstaff, AZ (US)

( * ) Notice: Subject to any disclaimer, the term of this patent is extended or adjusted under 35 U.S.C. 154(b) by 565 days.

(21) Appl. No.: 12/149,933

(22) Filed: May 9, 2008

(65) Prior Publication Data

US 2009/0208771 A1 Aug. 20, 2009

Related U.S. Application Data

(60) Provisional application No. 60/924,328, filed on May 9, 2007, provisional application No. 61/064,162, filed on Feb. 20, 2008, provisional application No. 61/064,161, filed on Feb. 20, 2008.

(51) Int. Cl.
*B32B 5/22* (2006.01)
*B32B 7/08* (2006.01)
*B32B 15/16* (2006.01)
*B22F 7/06* (2006.01)

(52) U.S. Cl. ........ 428/548; 428/582; 428/583; 428/609; 419/6; 419/8

(58) Field of Classification Search ....... 419/8; 428/609
See application file for complete search history.

(56) References Cited

U.S. PATENT DOCUMENTS

| 59,189 | A | * | 10/1866 | Cornell | 164/109 |
| 1,361,136 | A | | 12/1920 | Burke | |
| 1,935,916 | A | * | 11/1933 | Ragsdale | 76/107.1 |
| 2,078,668 | A | | 4/1937 | Kilgore | |
| 2,475,321 | A | * | 7/1949 | Horn | 336/233 |
| 2,888,742 | A | * | 6/1959 | Stumbock | 428/556 |
| 3,341,932 | A | * | 9/1967 | Haller | 29/432 |
| 3,345,452 | A | * | 10/1967 | Logan et al. | 174/71 R |
| 3,346,951 | A | * | 10/1967 | Gwyn, Jr. | 29/879 |
| 3,372,007 | A | * | 3/1968 | Shaver | 428/594 |
| 3,403,273 | A | | 9/1968 | Hiroshi | |
| 3,437,854 | A | | 4/1969 | Oiso | |
| 3,558,941 | A | | 1/1971 | Visconti Brebbia et al. | |
| 3,648,343 | A | * | 3/1972 | Haller | 419/8 |
| 3,700,942 | A | | 10/1972 | Alth | |
| 3,710,158 | A | | 1/1973 | Bachle et al. | |

(Continued)

FOREIGN PATENT DOCUMENTS

DE 1513856 4/1969

(Continued)

OTHER PUBLICATIONS

Office Action dated Aug. 9, 2010 for U.S. Appl. No. 12/611,733.

(Continued)

*Primary Examiner* — John Zimmerman
(74) *Attorney, Agent, or Firm* — Snell & Wilmer L.L.P.

(57) ABSTRACT

A powdered metal assembly includes a mechanical part, a powdered metal part and a fastener configured to join the mechanical part and the powdered metal part. In another aspect of the disclosure, a method for manufacturing a powdered metal assembly may include the steps of positioning the mechanical part in a forming apparatus, providing a powdered metal into the forming apparatus, compressing the powdered metal to form and bond a powdered metal part to the mechanical part to form the powdered metal assembly, and removing the powdered metal assembly from the forming apparatus.

10 Claims, 13 Drawing Sheets

U.S. PATENT DOCUMENTS

| | | | |
|---|---|---|---|
| 3,774,059 A | 11/1973 | Cox | |
| 4,003,286 A * | 1/1977 | Hallock | 411/495 |
| 4,021,691 A | 5/1977 | Dukshtau et al. | |
| 4,114,057 A | 9/1978 | Esters | |
| 4,206,374 A | 6/1980 | Goddijn | |
| 4,237,396 A | 12/1980 | Blenkinsop et al. | |
| 4,255,684 A | 3/1981 | Mischler et al. | |
| 4,363,988 A | 12/1982 | Kliman | |
| 4,388,545 A | 6/1983 | Honsinger et al. | |
| 4,392,072 A | 7/1983 | Rosenberry | |
| 4,459,501 A | 7/1984 | Fawzy | |
| 4,501,980 A | 2/1985 | Welburn | |
| 4,605,874 A | 8/1986 | Whiteley | |
| 4,611,139 A | 9/1986 | Godkin et al. | |
| 4,620,752 A | 11/1986 | Fremerey et al. | |
| 4,658,166 A | 4/1987 | Oudet | |
| 4,794,286 A | 12/1988 | Taenzer | |
| 4,797,602 A | 1/1989 | West | |
| 4,835,840 A | 6/1989 | Stokes | |
| 4,850,100 A | 7/1989 | Stokes | |
| 4,900,965 A | 2/1990 | Fisher | |
| 4,959,577 A | 9/1990 | Radomski | |
| 5,038,066 A | 8/1991 | Pawlak et al. | |
| 5,051,641 A | 9/1991 | Weh | |
| 5,097,167 A | 3/1992 | Kanayama et al. | |
| 5,117,142 A | 5/1992 | von Zweygbergk | |
| 5,121,537 A * | 6/1992 | Matsui et al. | 29/522.1 |
| 5,130,595 A | 7/1992 | Arora | |
| 5,132,581 A | 7/1992 | Kusase | |
| 5,177,054 A | 1/1993 | Lloyd | |
| 5,208,503 A | 5/1993 | Hisey | |
| 5,212,419 A | 5/1993 | Fisher et al. | |
| 5,244,746 A * | 9/1993 | Matsui et al. | 428/609 |
| 5,250,865 A | 10/1993 | Meeks | |
| 5,262,746 A | 11/1993 | Masuda | |
| 5,278,470 A | 1/1994 | Neag | |
| 5,289,072 A | 2/1994 | Lange | |
| 5,306,977 A | 4/1994 | Hayashi | |
| 5,382,859 A | 1/1995 | Huang et al. | |
| 5,386,166 A | 1/1995 | Reimer et al. | |
| 5,530,308 A | 6/1996 | Fanning et al. | |
| 5,543,674 A | 8/1996 | Koehler | |
| 5,543,677 A | 8/1996 | Fakler | |
| 5,633,551 A | 5/1997 | Weh | |
| 5,650,680 A | 7/1997 | Chula | |
| 5,712,521 A | 1/1998 | Detela | |
| 5,729,065 A | 3/1998 | Fremery et al. | |
| 5,731,649 A | 3/1998 | Caamano | |
| 5,773,910 A | 6/1998 | Lange | |
| 5,777,418 A | 7/1998 | Lange et al. | |
| 5,780,953 A | 7/1998 | Umeda et al. | |
| 5,814,907 A | 9/1998 | Bandera | |
| 5,886,449 A | 3/1999 | Mitcham | |
| 5,889,348 A | 3/1999 | Mühlberger et al. | |
| 5,894,183 A | 4/1999 | Borchert | |
| 5,925,965 A | 7/1999 | Li et al. | |
| 5,942,828 A | 8/1999 | Hill | |
| 5,973,436 A | 10/1999 | Mitcham | |
| 5,994,802 A | 11/1999 | Shichijyo et al. | |
| 6,028,377 A | 2/2000 | Sakamoto | |
| 6,043,579 A | 3/2000 | Hill | |
| 6,060,810 A | 5/2000 | Lee et al. | |
| 6,066,906 A | 5/2000 | Kalsi | |
| 6,097,126 A | 8/2000 | Takura | |
| 6,121,712 A | 9/2000 | Sakamoto | |
| 6,133,655 A | 10/2000 | Suzuki et al. | |
| 6,133,669 A | 10/2000 | Tupper | |
| 6,137,202 A | 10/2000 | Holmes et al. | |
| 6,154,013 A | 11/2000 | Caamano | |
| 6,163,097 A | 12/2000 | Smith et al. | |
| 6,177,748 B1 | 1/2001 | Katcher et al. | |
| 6,181,035 B1 | 1/2001 | Acquaviva | |
| 6,194,799 B1 | 2/2001 | Miekka | |
| 6,229,238 B1 | 5/2001 | Graef | |
| 6,232,693 B1 | 5/2001 | Gierer et al. | |
| 6,236,131 B1 | 5/2001 | Schafer | |
| 6,300,702 B1 | 10/2001 | Jack et al. | |
| 6,365,999 B1 | 4/2002 | Mühlberger et al. | |
| 6,445,105 B1 | 9/2002 | Kliman et al. | |
| 6,448,687 B2 | 9/2002 | Higashino et al. | |
| 6,455,970 B1 | 9/2002 | Shafer et al. | |
| 6,471,406 B1 * | 10/2002 | Cadle et al. | 384/433 |
| 6,472,792 B1 | 10/2002 | Jack et al. | |
| 6,492,758 B1 | 12/2002 | Gianni et al. | |
| 6,545,382 B1 | 4/2003 | Bennett | |
| 6,603,060 B1 | 8/2003 | Cammano | |
| 6,603,237 B1 | 8/2003 | Caamano | |
| 6,657,329 B2 | 12/2003 | Kastinger et al. | |
| 6,664,704 B2 | 12/2003 | Calley | |
| 6,707,208 B2 | 3/2004 | Durham et al. | |
| 6,717,297 B2 | 4/2004 | Sadarangani et al. | |
| 6,774,512 B2 | 8/2004 | Takagi et al. | |
| 6,794,791 B2 | 9/2004 | Ben Ahmed et al. | |
| 6,815,863 B1 | 11/2004 | Jack et al. | |
| 6,849,985 B2 | 2/2005 | Jack et al. | |
| 6,853,112 B2 | 2/2005 | Nakamura et al. | |
| 6,867,530 B2 | 3/2005 | Gamm et al. | |
| 6,879,080 B2 | 4/2005 | Cammano | |
| 6,885,129 B1 | 4/2005 | Oohashi et al. | |
| 6,924,579 B2 | 8/2005 | Calley | |
| 6,940,197 B2 | 9/2005 | Fujita et al. | |
| 6,949,855 B2 | 9/2005 | Dubois et al. | |
| 6,979,925 B2 | 12/2005 | Schwamm | |
| 6,989,622 B1 | 1/2006 | Chen et al. | |
| 7,015,603 B2 | 3/2006 | Barrho et al. | |
| 7,026,737 B2 | 4/2006 | Angerer et al. | |
| 7,030,529 B2 | 4/2006 | Dommsch et al. | |
| 7,030,534 B2 | 4/2006 | Cammano | |
| 7,064,469 B2 | 6/2006 | Jack et al. | |
| 7,067,954 B2 | 6/2006 | Kuribayashi et al. | |
| 7,071,593 B2 | 7/2006 | Matsushita et al. | |
| 7,126,313 B2 | 10/2006 | Dooley | |
| 7,129,602 B2 | 10/2006 | Lange et al. | |
| 7,135,802 B2 | 11/2006 | Seki et al. | |
| 7,165,310 B2 * | 1/2007 | Murakami et al. | 29/505 |
| 7,208,856 B2 | 4/2007 | Imai et al. | |
| 7,211,922 B2 | 5/2007 | Isoda et al. | |
| 7,230,361 B2 | 6/2007 | Hirzel | |
| 7,245,055 B2 | 7/2007 | Jack | |
| 7,250,704 B1 | 7/2007 | Sortore et al. | |
| 7,358,639 B2 | 4/2008 | Cammano | |
| 7,385,329 B2 | 6/2008 | Hill | |
| 7,385,330 B2 | 6/2008 | Trzynadlowski et al. | |
| 7,420,312 B2 | 9/2008 | Kitamura et al. | |
| 7,466,057 B2 | 12/2008 | Imai et al. | |
| 7,592,735 B2 | 9/2009 | Hamada | |
| 7,602,095 B2 | 10/2009 | Kusase | |
| 2001/0001528 A1 | 5/2001 | Ragaly | |
| 2001/0030479 A1 | 10/2001 | Mohler | |
| 2001/0030486 A1 | 10/2001 | Pijanowski | |
| 2002/0070627 A1 | 6/2002 | Ward et al. | |
| 2002/0135242 A1 | 9/2002 | Kawai | |
| 2002/0146584 A1 * | 10/2002 | Fried | 428/609 |
| 2003/0089621 A1 * | 5/2003 | Anderson et al. | 205/660 |
| 2003/0122439 A1 | 7/2003 | Horst | |
| 2003/0122440 A1 | 7/2003 | Horst | |
| 2004/0061396 A1 | 4/2004 | Narita et al. | |
| 2004/0140730 A1 | 7/2004 | Barrho et al. | |
| 2004/0145269 A1 | 7/2004 | Barrho et al. | |
| 2004/0150288 A1 | 8/2004 | Calley | |
| 2004/0189138 A1 | 9/2004 | Jack | |
| 2004/0191519 A1 | 9/2004 | Kejzelman et al. | |
| 2004/0212267 A1 | 10/2004 | Jack et al. | |
| 2004/0232799 A1 | 11/2004 | Chen et al. | |
| 2004/0251759 A1 | 12/2004 | Hirzel | |
| 2004/0251761 A1 | 12/2004 | Hirzel | |
| 2004/0262105 A1 | 12/2004 | Li et al. | |
| 2005/0006978 A1 | 1/2005 | Bradfield | |
| 2005/0012427 A1 | 1/2005 | Seki et al. | |
| 2005/0062348 A1 | 3/2005 | Ohnishi et al. | |
| 2005/0121983 A1 | 6/2005 | Ehrhart | |
| 2005/0139038 A1 | 6/2005 | Kjellen et al. | |
| 2005/0156479 A1 | 7/2005 | Fujita et al. | |
| 2005/0242679 A1 | 11/2005 | Walter et al. | |
| 2006/0012259 A1 | 1/2006 | Kerlin | |
| 2006/0012263 A1 | 1/2006 | Smith et al. | |
| 2006/0082237 A1 | 4/2006 | Kerlin | |

| | | | |
|---|---|---|---|
| 2006/0091755 | A1 | 5/2006 | Carlisle |
| 2006/0131974 | A1 | 6/2006 | Sadarangani et al. |
| 2006/0131986 | A1 | 6/2006 | Hsu et al. |
| 2006/0192453 | A1 | 8/2006 | Gieras et al. |
| 2006/0220477 | A1 | 10/2006 | Okumoto et al. |
| 2006/0261688 | A1 | 11/2006 | Akita et al. |
| 2007/0013253 | A1 | 1/2007 | Dobois et al. |
| 2007/0046137 | A1 | 3/2007 | Ooiwa |
| 2007/0046139 | A1 | 3/2007 | Ishizuka |
| 2007/0075605 | A1 | 4/2007 | Enomoto et al. |
| 2007/0138900 | A1 | 6/2007 | Imai et al. |
| 2007/0152528 | A1 | 7/2007 | Kang et al. |
| 2007/0176505 | A1 | 8/2007 | Trzynadlowski et al. |
| 2008/0007126 | A1 | 1/2008 | Popov et al. |
| 2008/0169776 | A1 | 7/2008 | Acker |
| 2008/0211326 | A1 | 9/2008 | Kang et al. |
| 2008/0265707 | A1 | 10/2008 | Bradfield |
| 2008/0309188 | A1 | 12/2008 | Calley |
| 2008/0315700 | A1 | 12/2008 | Ishikawa et al. |
| 2009/0042051 | A1 | 2/2009 | Skarman et al. |
| 2009/0152489 | A1 | 6/2009 | Kjellen et al. |
| 2009/0243406 | A1 | 10/2009 | Jack et al. |
| 2010/0015432 | A1 | 1/2010 | Bergmark et al. |
| 2010/0038580 | A1 | 2/2010 | Ye et al. |

FOREIGN PATENT DOCUMENTS

| | | |
|---|---|---|
| DE | 3626149 | 8/1986 |
| DE | 3602687 | 8/1987 |
| DE | 8711725 | 8/1987 |
| DE | 3927453 | 2/1991 |
| DE | 19634949 | 5/1998 |
| DE | 102006026719 | 6/2006 |
| EP | 0 544 200 A1 | 11/1992 |
| EP | 0707374 | 4/1996 |
| EP | 0718959 | 6/1996 |
| EP | 0998010 | 3/2000 |
| EP | 1117168 | 7/2001 |
| EP | 1227566 | 7/2002 |
| EP | 1 063 754 B1 | 12/2007 |
| GB | 518298 | 9/1938 |
| GB | 2052176 | 1/1986 |
| JP | 60-241758 A | 11/1985 |
| JP | 61042248 | 2/1986 |
| JP | 1-100210 * | 4/1989 |
| JP | 2001025197 | 1/2001 |
| KR | 10-2008-0061415 | 3/2008 |
| WO | WO 93/14551 | 7/1993 |
| WO | WO 99/34497 | 7/1999 |
| WO | WO 02/075895 | 9/2002 |
| WO | WO 2005/091475 | 9/2005 |
| WO | WO 2007024184 | 3/2007 |
| WO | WO 2009116935 | 9/2009 |
| WO | WO 2009116936 | 9/2009 |
| WO | WO 2009116937 | 9/2009 |

OTHER PUBLICATIONS

Notice of Allowance dated Aug. 12, 2010 for U.S. Appl. No. 12/611,728.
Notice of Allowance dated Aug. 19, 2010 for U.S. Appl. No. 12/611,737.
Notice of Allowance dated Sep. 8, 2010 for U.S. Appl. No. 12/149,934.
Notice of Allowance dated Oct. 6, 2010 for U.S. Appl. No. 12/149,935.
Woolmer, T.J. et al.; "Analysis of the Yokeless and Segmented Armature Machine"; Electric Machines & Drives Conference; 2007; IEMDC; apos;07; IEEE International vol. 1; Issue; 3-5; May 2007; pp. 704-708.
Technical Project Presentation—Development of a High-Performance Generator for Wind Turbines—by Andrzej M. Trzynadlowski, PhD, University of Nevada, Reno, FIEEE, Aug. 2007.
"Magnetic Field Calculation of Claw Pole Permanent Magnet Machines Using Magnetic Network Method": J. Elect. Electron. Eng., Australia, vol. 22, No. 1, pp. 69-75, 2002.
"Iron Loss Calculation in a Claw-Pole Structure", by A. Reinap et al., Lund University, Jun. 2004.

Dubois, Maxine R. et al.; "Clawpole Transverse-Flux Machine with Hybrid Stator"; pp. 1-6, Jul. 15, 2006.
Fundamental Modeling for Optimal Design of Transverse Flux Motors—Genevieve Patterson et al., University of Tokyo, 2008.
Raser Technologies Company Brochure, 2005.
ISR and WO dated Jun. 10, 2010 for International Application No. PCT/US2009/063145.
ISR and WO dated Jun. 10, 2010 for International Application No. PCT/US2009/063142.
ISR and WO dated Jun. 18, 2010 for International Application No. PCT/US2009/063147.
Office Action dated May 19, 2010 for U.S. Appl. No. 12/149,934.
Office Action dated Jul. 27, 2010 for U.S. Appl. No. 12/149,936.
Response to Office Action filed Jan. 15, 2010 for Japanese Patent Application No. 2003-548374.
Office Action dated Mar. 2, 2010 for U.S. Appl. No. 12/149,931.
Restriction Requirement dated Apr. 5, 2010 for U.S. Appl. No. 12/149,934.
Office Action dated Apr. 28, 2010 for U.S. Appl. No. 12/149,935.
Notice of Allowance dated May 4, 2010 for U.S. Appl. No. 12/149,931.
Restriction Requirement dated Apr. 22, 2010 for U.S. Appl. No. 12/149,936.
Notice of Allowance dated Mar. 29, 2005 for U.S. Appl. No. 10/721,765.
Notice of Allowance dated Feb. 13, 2008 for U.S. Appl. No. 11/679,806.
Notice of Allowance dated May 30, 2003 for U.S. Appl. No. 10/273,238.
Notice of Allowance dated Nov. 3, 2009 for U.S. Appl. No. 12/149,931.
Office Action dated Sep. 28, 2007 for U.S. Appl. No. 11/679,806.
Notice of Allowance dated Dec. 30, 2009 for U.S. Appl. No. 12/149,931.
Office Action dated Sep. 13, 2004 for U.S. Appl. No. 10/721,765.
ISR/WO dated Aug. 15, 2008 for International Patent Application No. PCT/US2008/063301.
IPRP dated Nov. 10, 2009 for International Patent Application No. PCT/US2008/063301.
ISR/WO dated Aug. 20, 2008 for International Patent Application No. PCT/US2008/063236.
IPRP dated Nov. 17, 2009 for International Patent Application No. PCT/US2008/063236.
ISR/WO dated Oct. 24, 2008 for International Patent Application No. PCT/US2008/063336.
IPRP dated Nov. 17, 2009 for International Patent Application No. PCT/US2008/063336.
ISR/WO dated Aug. 15, 2008 for International Patent Application No. PCT/US2008/063287.
IPRP dated Nov. 10, 2009 for International Patent Application No. PCT/US2008/063287.
ISR/WO dated Nov. 10, 2009 for International Patent Application No. PCT/US2008/063268.
IPRP dated Nov. 10, 2009 for International Patent Application No. PCT/US2008/063268.
Technical Project Presentation—Development of a High-Performance Generator for Wind Turbines—by Andrzej M. Trzynadlowski, PhD, University of Nevada, Reno, FIEEE.
Technical Project Presentation—Development of a High-Performance Generator for Wind Turbines—Final Report—University of Nevada, Reno—Feb. 2004.
"Magnetic Field Calculation of Claw Pole Permanent Magnet Machines Using Magnetic Network Method", by Y.G. Guo et al., Faculty of Engineering, University of Technology, Sydney.
"Applications of Power Electronics in Automotive Power Generation",—by David J. Perreault et al., Laboratory for Electromagnetic and Electronic Systems, Massachusetts Institute of Technology, Jun. 21-22, 2006—Paris.
"Thermal Modeling of Lundell Alternators", IEEE Transactions on Energy Conversion, vol. 20, No. 1, Mar. 2005.
"Iron Loss Calculation in a Claw-Pole Structure", by A. Reinap et al., Lund University.

"Permanent Magnet Assisted Synchronous Reluctance Motor Design and Performance Improvement",—A Dissertation by Peyman Niazi, Texas A&M University, Dec. 2005.

"New Design of Hybrid-Type Self-Bearing Motor for Small, High-Speed Spindle",—by Hideki Kanebako et al., IEEE/ASME Transactions on Mechatronics, vol. 8, No. 1, Mar. 2003, retrieved Jan. 8, 2010.

"Evaluation of Rotor Conducting Screens on the Single-Phase Switched Reluctance Machine",—by M.M. Mahmoud et al., School of Engineering and Physical Sciences, Heriot-Watt University, Riccarton, Edinburgh, Scotland, United Kingdom, May 3, 2005.

"Analytical Interpretation and Quantification of Rotational Losses in Stator Cores of Induction Motors",—IEEE Transactions on Magnetics, vol. 43, No. 10, Oct. 2007, retrieved Jan. 8, 2010.

Office Action dated Nov. 30, 2009 for U.S. Appl. No. 12/149,935.

Theory of SR Motor Operation (Power Point Presentation), copyright 2002 by George Holling and Rocky Mountain Technologies Inc.

Development of a PM Transverse Flux Motor With Soft Magnetic Composite Core—IEEE Transactions on Energy Conversion, vol. 21, No. 2., Jun. 2006.

Fundamental Modeling for Optimal Design of Transverse Flux Motors—Genevieve Patterson et al., University of Tokyo. www.higenmotor.com/eng/aboutus/about06read.asp?id=notice&no=87 dated Jan. 15, 2010.

Lyng Eltorque QT 800-2.0 User Manual, version 1.0—dated Jul. 3, 2007.

Motors: Emerging Concepts by George Holling, Apr. 2007. www.iem.rwth-aachen.de/index.pl/new materials and machines?makePrintable=1; retrieved Jan. 15, 2010.

Raser Technologies Company Brochure.

Hasubek, B. E. et al.; "Design Limitations of Reduced Magnet Material Passive Rotor Transverse Flux Motors Investigated using 3D Finite Element Analysis"; 2000; pp. 365-369.

Dubois, Maxime R. et al.; "Clawpole Transverse-Flux Machine with Hybrid Stator"; pp. 1-6.

Henneberger G. et al.; "On the Parameters Computation of a Single Sided Transverse Flux Motor"; May 26, 2001; pp. 35-40.

Husband, S.M. et al.; "The Rolls-Royce Transverse Flux Motor Development"; 2003; pp. 1435-1440.

* cited by examiner

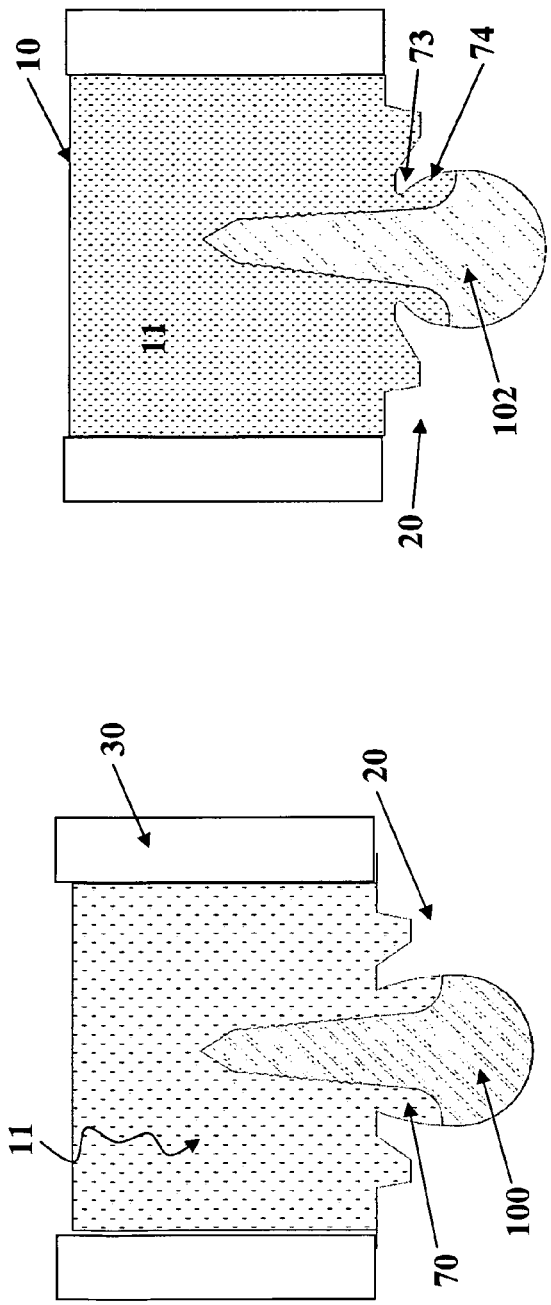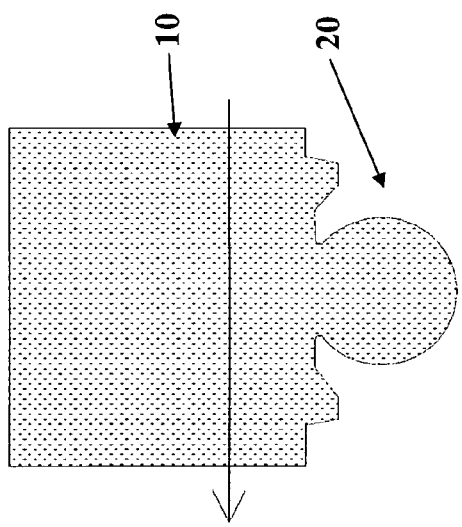

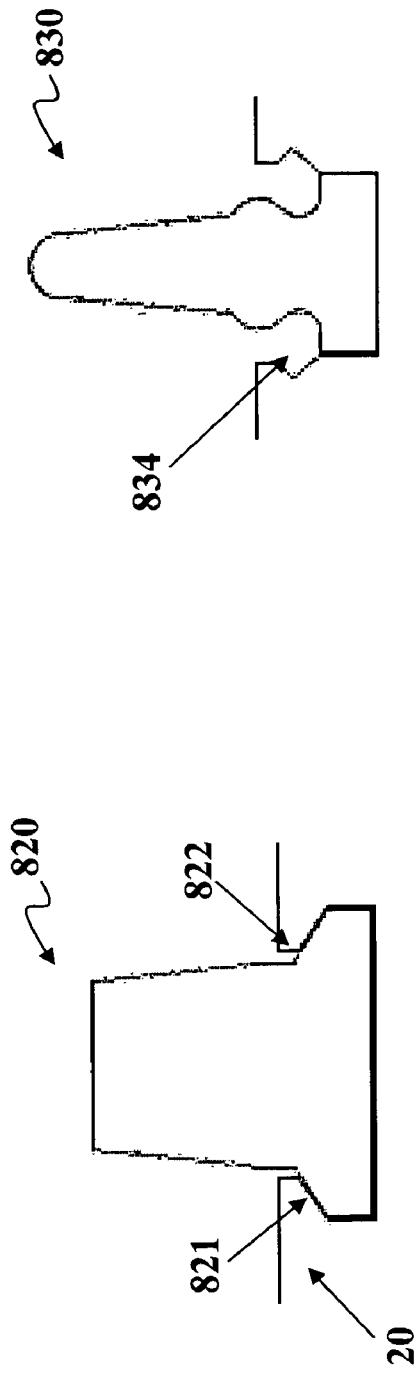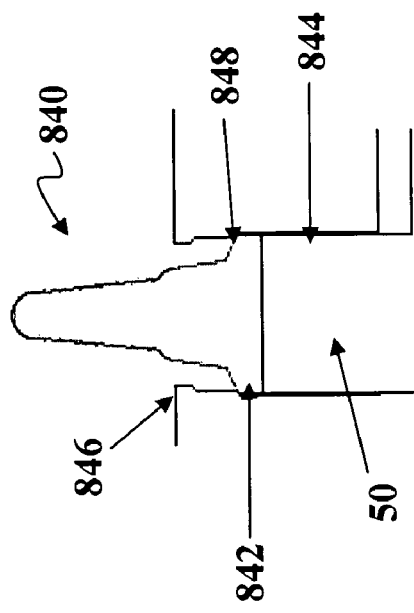
FIG. 14A
FIG. 14B
FIG. 14C

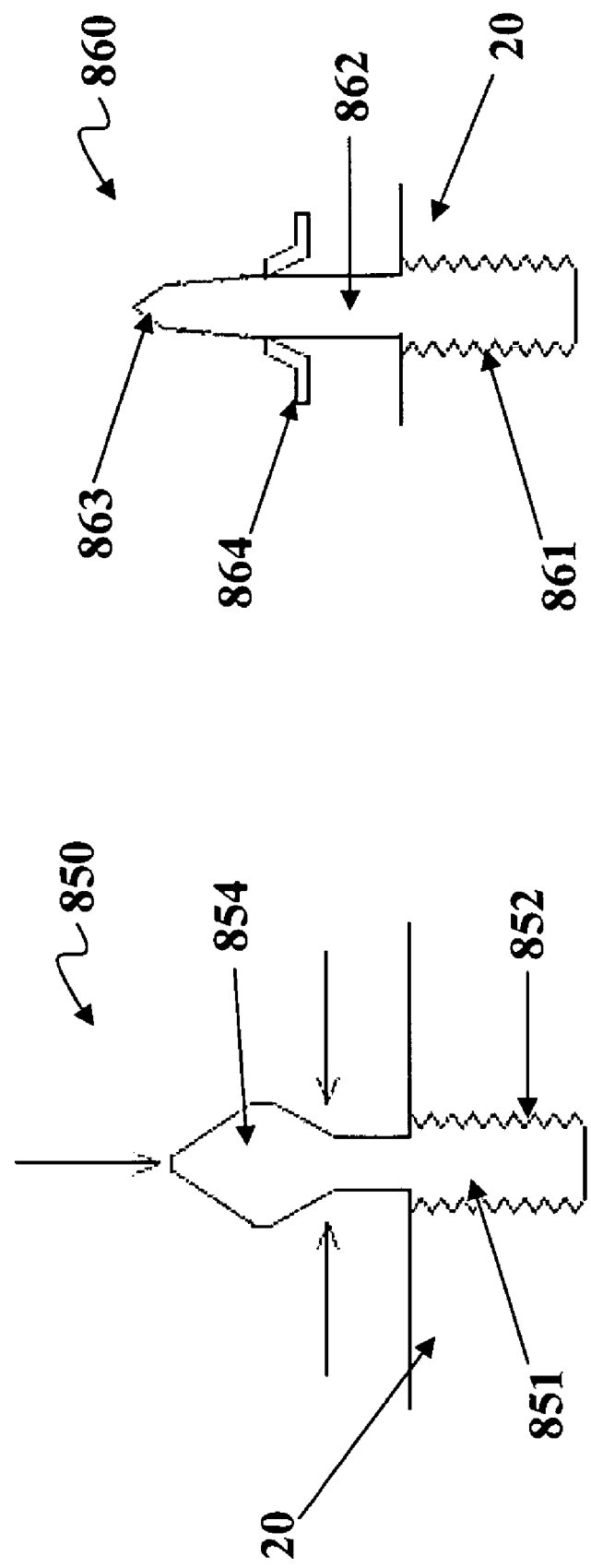

POWDERED METAL MANUFACTURING METHOD AND DEVICES

This application claims priority to Applicant's U.S. Provisional Patent Appl. No. 60/924,328 titled "ELECTRICAL OUTPUT GENERATING DEVICES AND DRIVEN ELECTRICAL DEVICES, AND METHODS OF MAKING AND USING THE SAME" filed May 9, 2007, U.S. Provisional Patent Appl. No. 61/064,162 titled "ELECTRICAL OUTPUT GENERATING DEVICES AND DRIVEN ELECTRICAL DEVICES, AND METHODS OF MAKING AND USING THE SAME" filed Feb. 20, 2008, and to U.S. Provisional Patent Appl. No. 61/064,161 titled "LAMINATE ROTOR OR STATOR ELEMENTS FOR ELECTRICAL OUTPUT GENERATING DEVICES AND DRIVEN ELECTRICAL DEVICES, AND METHODS OF MAKING AND USING SUCH ELEMENTS AND DEVICES" filed Feb. 20, 2008. This application has a common filing date with U.S. patent application Ser. No. 12/149,931, now U.S. Pat. No. 7,800,275 titled "ELECTRICAL DEVICES USING ELECTROMAGNETIC ROTORS" U.S. patent application Ser. No. 12/149,935, now U.S. Pat. No. 7,876,019 titled "ELECTRICAL DEVICES WITH REDUCED FLUX LEAKAGE USING PERMANENT MAGNET COMPONENTS" U.S. patent application Ser. No. 12/149,934, now U.S. Pat. No. 7,868,511 titled "ELECTRICAL DEVICES USING DISK AND NON-DISK SHAPED ROTORS", and U.S. patent application Ser. No. 12/149,936, now U.S. Patent Application Publication No. 2009/020,6693 titled "ELECTRICAL OUTPUT GENERATING DEVICES AND DRIVEN ELECTRICAL DEVICES HAVING TAPE WOUND CORE LAMINATE ROTOR OR STATOR ELEMENTS, AND METHODS OF MAKING AND USE THEREOF", the entirety of each of which is hereby incorporated by reference herein.

BACKGROUND OF THE INVENTION

1. Field of the Invention

Aspects of the present invention relate to the field of manufactured powdered metal parts, and, in particular, to devices and methods for affixing powdered metal parts to other mechanical parts, and methods of making and use thereof.

2. Background of the Technology

The ability to construct devices from powdered metal materials has many advantages. Powdered metal parts can be molded precisely, allowing strict tolerance compliance in using the parts in assemblies. The molding process allows design of complex parts because minimal or no additional machining is required to bring the parts within tolerance.

Most powdered metal parts are cured through a sintering process which includes heating of the powdered metal part to a temperature below melting but high enough to foster adherence of the powdered metal particles to one another. Sintering is generally used to increase the strength of a part, but sintering may aggravate the magnetic properties of a powdered metal part, making the process undesirable for certain applications, including for use as magnetic flux concentrators in electric motors.

SUMMARY OF THE INVENTION

Particular variations of methods and devices for joining powdered metal parts described in accordance with aspects of the present application may satisfy one or more of the above identified needs, as well as others, by disclosing powdered metal parts and fasteners, methods of making and use thereof, that, among other things, permit the attachment of powdered metal parts to other parts of dissimilar material without disruption of the magnetic flux properties of the powdered metal parts. With these features and others, aspects of the present invention thereby provide other advantages, such as enabling more efficient manufacturing of joined parts.

In a first exemplary aspect of the present invention, a method of manufacture may begin by inserting a pre-machined mechanical part into a forming apparatus. Powdered metal fasteners or other attachment related mechanisms may be inserted into the pre-machined part by hand or directly by a fastener insert tool. A forming tool may be used to create a cavity or other features into or onto which a powdered metal is flowed. The powdered metal may then be mechanically pressed under high pressure to join a powdered metal part to a mechanical part via the fastener or other attachment related mechanism.

In another variation of the present invention, a powdered metal part is joined to a pre-machined mechanical part by direct molding with no fastening device or mechanism.

Other aspects of the present invention relate to various fastening devices for joining a powdered metal part to a pre-machined mechanical part through a pressing process.

Additional advantages and novel features relating to devices and methods for affixing powdered metal parts to other mechanical parts, and methods of making and use thereof, will be set forth in part in the description that follows, and in part will become more apparent to those skilled in the art upon examination of the following or upon learning by practice of aspects of the invention.

BRIEF DESCRIPTION OF THE FIGURES

In the drawings:

FIG. 5 is an exemplary illustration of powdered metal flowing down and compacting into the cavities of an exemplary mechanical part in accordance with aspects of the present invention;

FIG. 6 shows the impact of the powdered metal compaction on an exemplary powdered metal fastener in accordance with aspects of the present invention;

FIG. 7 illustrates the uninhibited effect of an exemplary powdered metal fastener on the magnetic flux of a powdered metal part in accordance with aspects of the present invention;

FIGS. 14A, 14B and 14C illustrate exemplary variations of a dove tail type fastener in accordance with aspects of the present invention;

FIGS. 15A and 15B illustrate exemplary variations of fasteners in accordance with aspects of the present invention.

DETAILED DESCRIPTION

Aspects of the present invention and its implementations are not limited to the specific components or assembly procedures disclosed herein. Many additional components and assembly procedures known in the art consistent with devices and methods for affixing powdered metal parts to other mechanical parts, and methods of making and use thereof will become apparent for use with particular aspects and implementations from this disclosure. Accordingly, for example, although devices and methods for joining powdered metal parts to mechanical parts for use in a magnetic environment, for example, are disclosed, such devices and/or methods, including implementing components, may comprise any suitable shape, size, style, type, model, version, measurement, concentration, material, quantity, and/or the like usable for such fastening devices and/or methods and implementing components, consistent with the intended operation of the devices.

Description of exemplary aspects and implementations of methods and devices for joining powdered metal parts will now be made with reference to the appended drawings.

Figure 1:
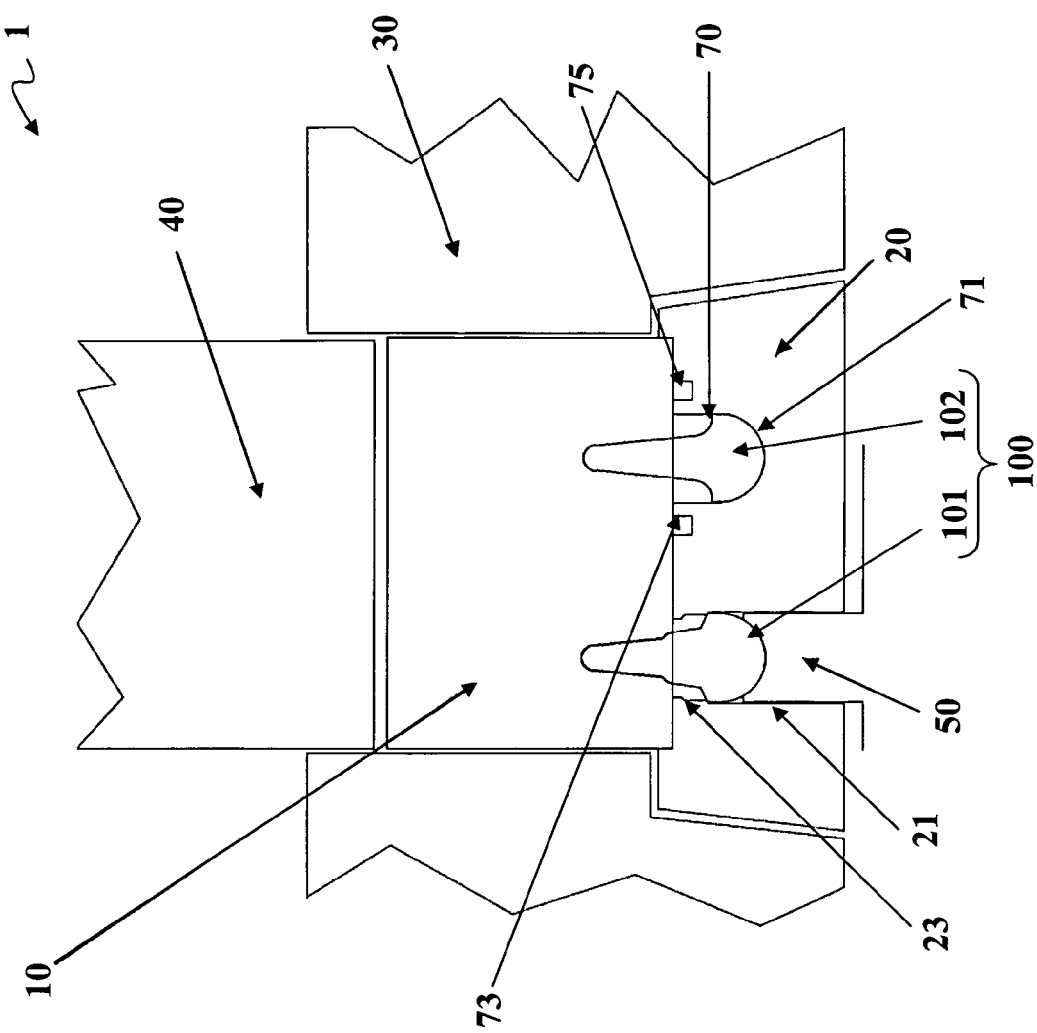
FIG. 1 illustrates an exemplary forming apparatus and affixing devices for forming and joining a powdered metal part to a mechanical part in accordance with aspects of the present invention.

FIG. 1 shows a sectional view of an exemplary forming apparatus 1 and fasteners 101, 102 for forming and joining a powdered metal part 10 to a mechanical part 20. (Note: when the term fastener is referenced as 100 in sections of the specification, the feature refers to fasteners or fastening devices, in general, of the type illustrated in this application. Use of reference numbers other than 100, for example 101 or 102, for a fastener indicate a particular embodiment of a fastener or fastening device, rather than fasteners in general.) A mechanical part 20 is provided and set into the forming apparatus 1, such as a powdered metal press. A form tool 30 may be provided that is configured to work in tandem with the mechanical press 40 to form the dimensional characteristics of the powdered metal part 10. The form tool 30 may comprise a mold machined from carbide, for example. The mold may have side walls and a bottom surface, for example, to form a cavity for placement and support of the mechanical part 20, prior to pressing. In another variation, the forming tool 30 may operate in tandem with a support boss 50, as shown in FIG. 1, to provide for support and placement of the mechanical part 20 prior to pressing.

The mechanical part 20 may be made from any of a variety of suitable material, including steel or aluminum, for example, and may be pre-machined as required to facilitate the manufacturing process. FIG. 1 illustrates two exemplary variations of the mechanical part 20 machined to receive a powdered metal fastener 101 or 102. Powdered metal fasteners may be described herein, but any of a variety of fasteners may be used, including solid metal fasteners. FIG. 1 illustrates a through-hole 21 that has been machined to receive a powdered metal fastener 101 inserted from the bottom and supported by a support boss 50. The through-hole 21 may include any number of geometric features to enhance the joining and manufacturing processes, including tapering the upper portion of the through-hole 21, for example, to provide a press fit of the fastener 101, or shoulders 23 may be provided as a seat for the fastener during the pressing operation. FIG. 1 also illustrates a fastener cavity 70, machined into the mechanical part 20, which may comprise a fastener seat 71, rollover lip 73 and coining gap 75, for example.

Figure 2:
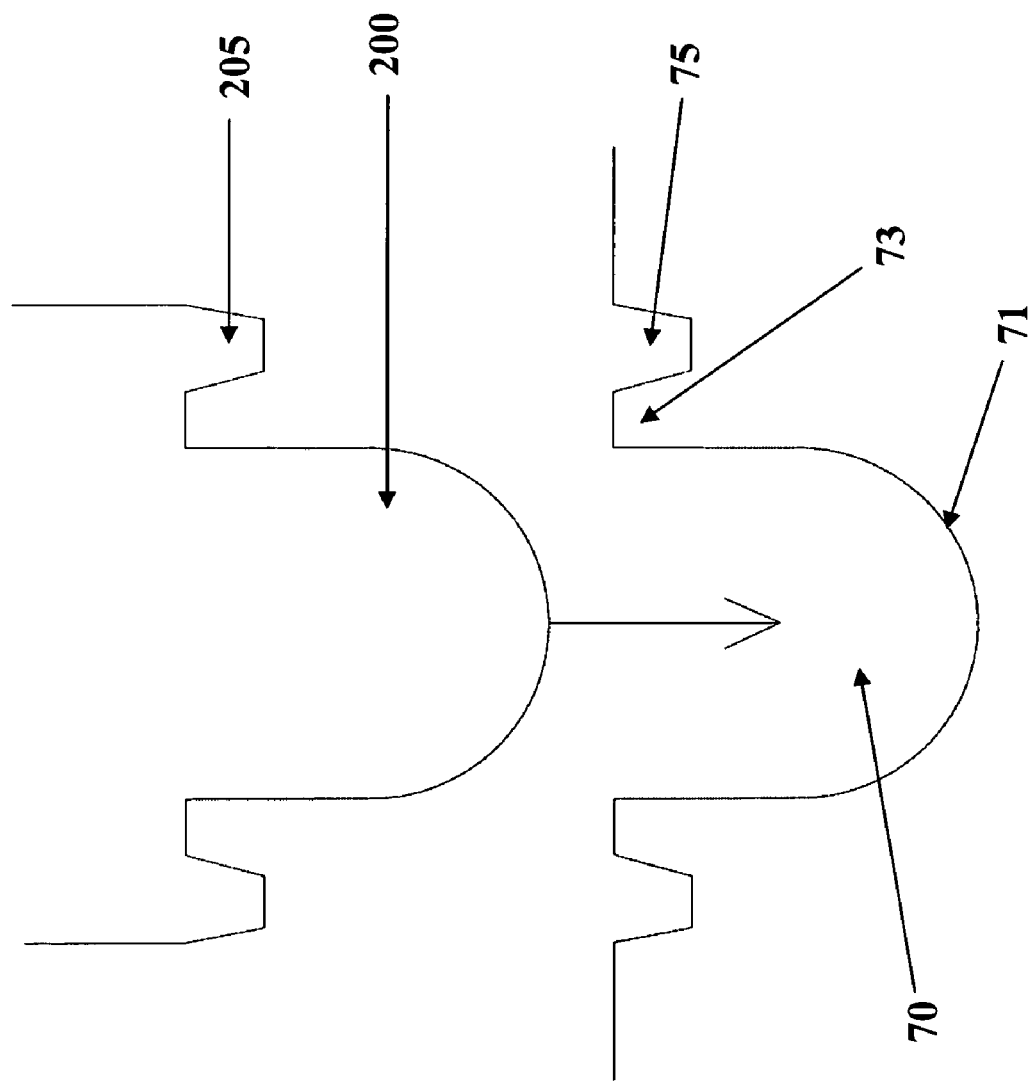
FIG. 2 illustrates an exemplary cutting device for forming the geometry of a mechanical part for accepting powdered metal fasteners in accordance with aspects of the present invention.

FIG. 2 illustrates an enlarged view of the fastener cavity 70 of FIG. 1. A special cutter 200 may be used to machine a fastener seat 71 to specific dimensions, in accordance with the type and size of a fastener to be used. The special cutter 200 may have a cutting flange 205 for milling a rollover lip 73 and associated coining gap 75, for example.

A method of manufacture may begin by inserting the pre-machined mechanical part 20 into the forming apparatus 1, as illustrated in FIG. 1. Powdered metal fasteners 100, for example, may be inserted into the pre-machined part by hand or directly via a placement tool (not shown). The fasteners 100 may be inserted into each seat 71, where the fasteners 100 may be held in place by an assembly adhesive, for example. The fasteners 100 may themselves be coated with assembly adhesive, or other surface treatments, to facilitate the bonding process. The assembly adhesive may hold the fastener in place prior to the pressing process, but the adhesive should not inhibit the free rotation or lateral movement of the fastener during the pressing process.

Figure 3:
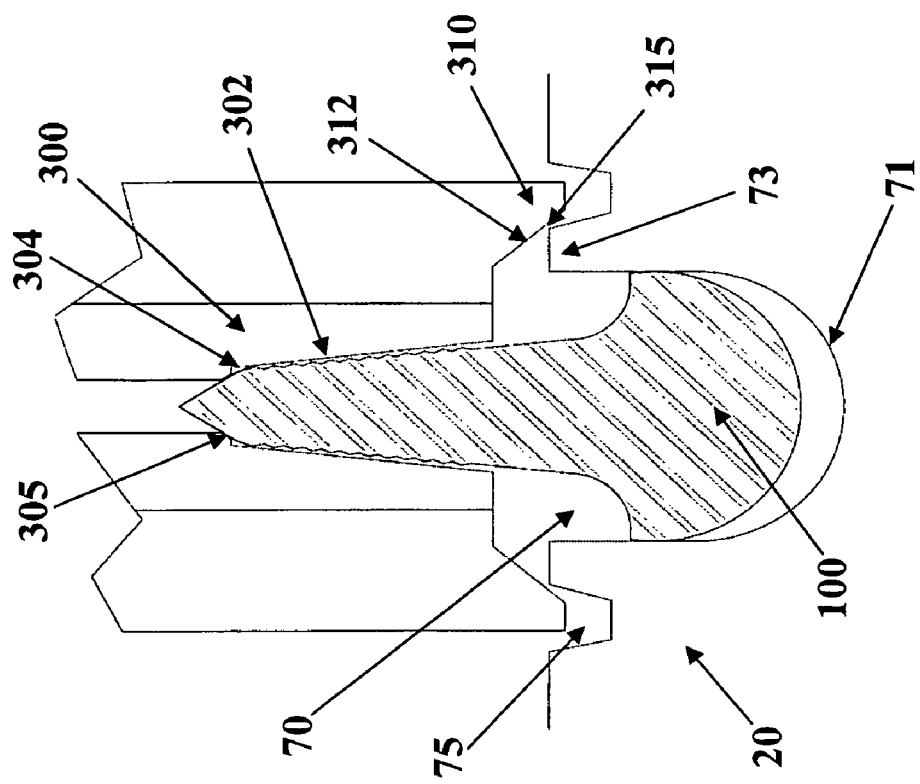
FIG. 3 illustrates an exemplary install tool for placing powdered metal fasteners in position for affixing a powdered metal part to a mechanical part in accordance with aspects of the present invention.

As shown in FIG. 3, a fastener install tool 300 may be configured to work with a particular fastener 100 and/or mechanical part 20, for example. The fastener install tool 300 may be designed with a tapered interior gap 302 for protecting aspects of the fastener, including the tip. The gap 302 may comprise configurations specific to the dimensions and geometry of a particular fastener. For instance, FIG. 3 shows a shoulder 304 and beveled surface 305 for properly seating the tip of the fastener in the fastener install tool without causing damage when the install tool yields a downward force while inserting the fastener 100 into the fastener cavity 70.

Figure 4:
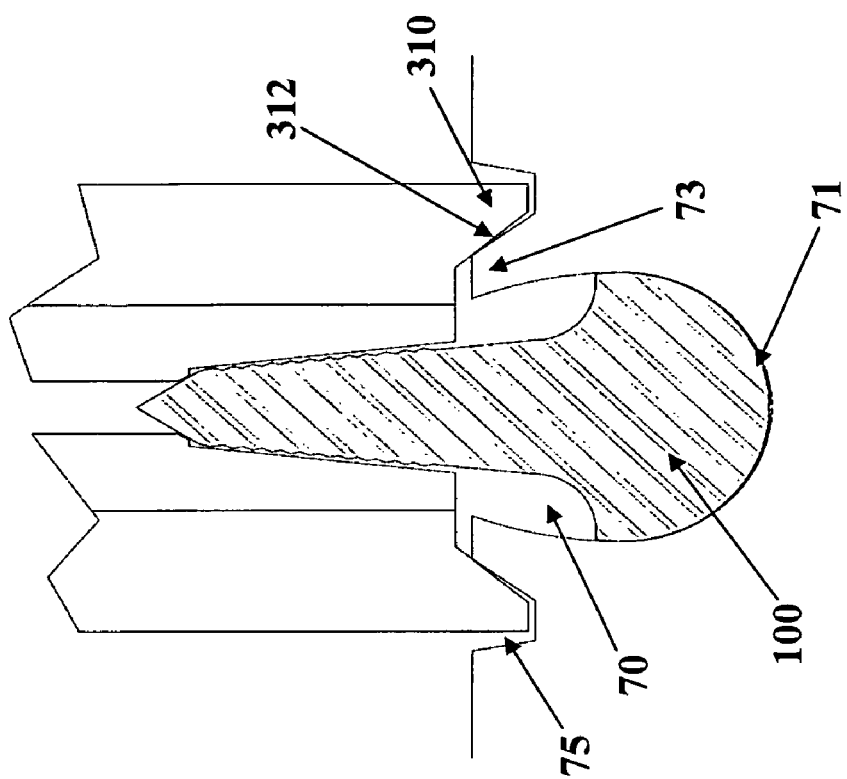
FIG. 4 shows the exemplary install tool of FIG. 3 after rolling the retention lip of the mechanical part in accordance with aspects of the present invention.

The fastener install tool 300 exerts a downward force on the fastener 100 until the fastener 100 is seated in the fastener seat 71. As the install tool pushes down on the fastener, as shown in FIG. 3, a flanged rim 310 on the install tool exerts a bending pressure on the rollover lip 73, in a coining process. The geometry of the flanged rim 310 may be such that an inwardly sloped surface 312 meets the rollover lip 73 at a point 315. As seen in FIG. 4, the downward force of the install tool, combined with the slope 312 of rim 310, may cause the rollover lip 73 to yield inward. While the rollover lip 73 folds over in a coining process, the flanged rim 310 slides into the coining gap 75. At this point, the fastener 100 fits snug in the fastener cavity 70, but, by virtue of the geometry of the seat 71 and the head of the fastener 100, the fastener may still twist or lean when subjected to pressure.

FIG. 5 illustrates another step in the process of affixing a powdered metal part 10 to the mechanical part 20. With the fastener 100 in the cavity 70, powdered metal 11 may be flowed downwardly, as shown in FIG. 5, into the cavity formed by the form tool 30 and the mechanical part 20.

FIG. 6 illustrates the powdered metal 11 after it is compacted by a mechanical press under high pressure, such as 60,000 pounds per square inch (psi). Because of the geometry of the fastener 102, such as the inclusion of a bulbous head, the fastener can yield to unequal forces exerted during the compacting process by twisting or tilting. The ability of the fastener to yield in this manner may permit complete compaction of the powdered metal material around the fastener and may protect the fastener from breaking. At the same time, as the pressure is exerted by the mechanical press on the powdered metal, the overhang of the rollover lip 73 creates a pocket 74 where the density of the packed powdered metal is lower than that of the packed powdered metal above the lip 73. The higher density of the material above may cause the lip 73 to further fold over the material below in pocket 74, causing the powdered metal in pocket 74 to further compress. The powdered metal above the folded lip 73 is thereby locked in place by the powdered metal at full density, or near full density, in pocket 74. In this manner, a powdered metal part 10 is simultaneously formed and affixed to the mechanical part 20.

The fold-over process of the lip 73, as well as the density in pocket 74, may be controlled to limit undue strain on the fastener 102, for instance. Because powdered metal particles do not behave like a fluid, the amount of lip rollover is important because a properly designed rollover creates a "dovetail", or reverse, taper effect, without compromising the compaction density of the powdered metal part. For example, the density of the powdered metal material in pocket 74 may be controlled by varying the thickness of the lip 73 during the machining of part 20, or by adjusting the initial overhang of lip 73 through configuration of the fastener install tool 310. Superior to simply packing the powdered metal into the pocket 74, a properly yielding lip 73 may become part of the pressing fixture for that micro region, in effect increasing the compaction of the powdered metal below the lip 73 and adding to the tensile strength of the bonded powdered metal part 10. Controlling the density may also be important in some applications for protecting the integrity of the fastener 102 during the pressing process. Too low of a density, for instance, could allow the lip 73 to fold completely over onto the fastener 102, possibly shattering or adversely impacting the structural integrity of the pre-formed and pre-strengthened powdered metal fastener 102. Once formed, the powdered metal fastener 102 may be magnetically invisible within the powdered metal part 10, allowing uninhibited flow of magnetic flux, as shown in FIG. 7.

Figure 8:
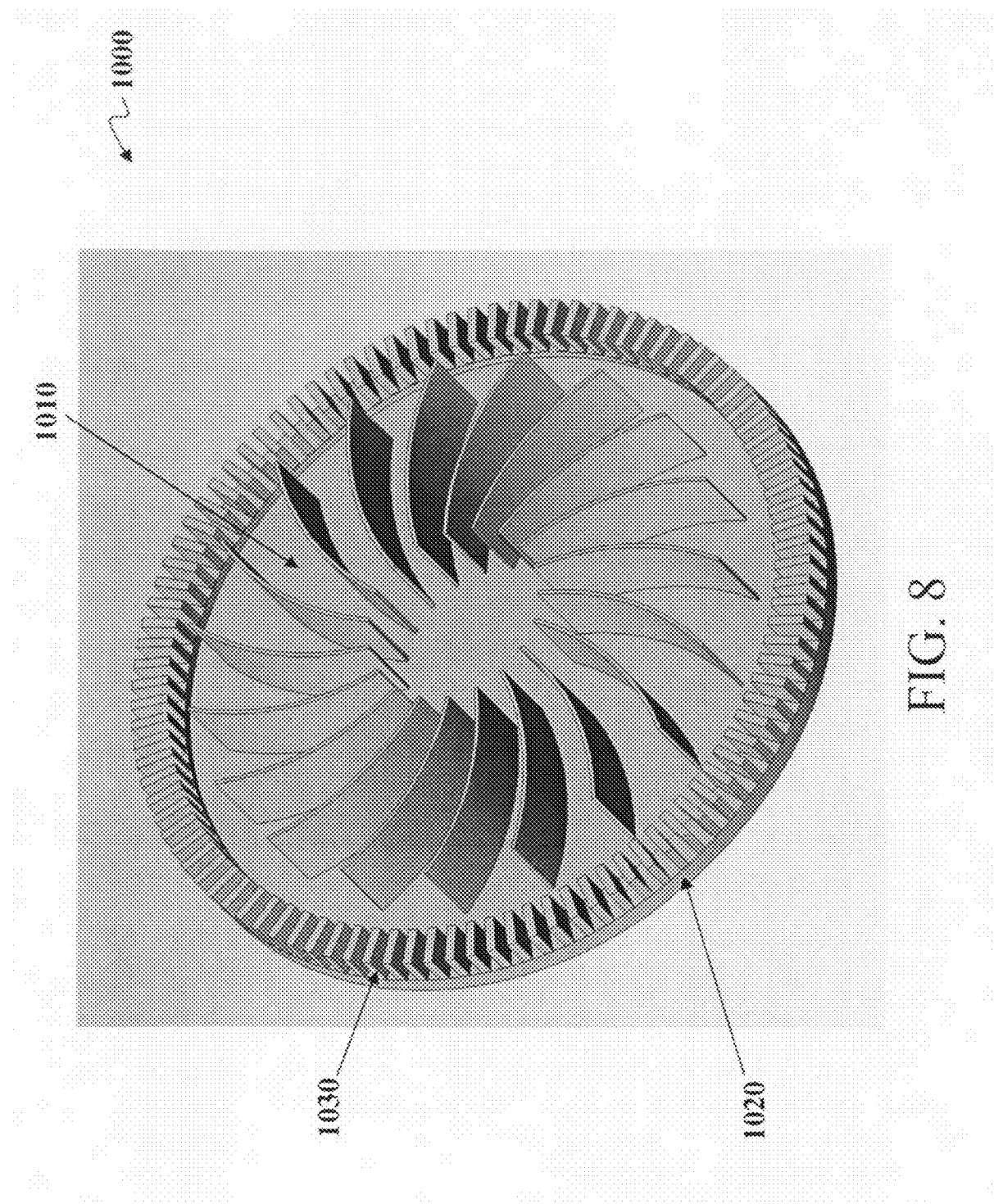
FIG. 8 illustrates an exemplary application of the methods and devices described herein in accordance with aspects of the present invention.

FIG. 8 shows one exemplary variation of a rotor portion 1000 of an electrical output generating device or driven electrical device for use in accordance with aspects of the present invention. Rotor portion 1000 includes an axial disk portion 1010, having a flange portion 1020. Attached to and extending from flange portion 1020 may be a plurality of rectangular or wedge shaped plates 1030. Such plates 1030, as shown in FIG. 8, may, for example, be affixed using powdered metal formed over one or more flux conducting fasteners or other fastening extensions attached to flange portion 1020, or machined into the disc, as described above.

An exemplary process may include configuring the axial disk portion 1010 with flange 1020 using a special cutter to accept powdered metal fasteners in pre-machined cavities. The pre-machined axial disk portion 1010 with flange 1020 may then be placed into a forming tool, for example. Powdered metal fasteners may be provided in the machined cavities using the fastener install tool, which also may bend a machined lip around the fastener in a coining process. Powdered metal may then be flowed into the forming tool cavity, and a mechanical press used to apply high pressure to the powdered metal flowed around the powdered metal fasteners, as described above. The rollover process of the machined lip, in combination with the powdered metal fastener, may hold the powdered metal plates 1030 in place. The mechanical press may then be released, and the rotor portion 1000, comprised of the powdered metal plates 1030 affixed to the axial disk 1010 with flange 1020, may be removed, without sintering. In this manner, the flux signature of the powdered metal part is controlled and constant, and the magnetic properties of the powdered metal fastener in the powdered metal part become invisible to flux traveling therethrough.

An exemplary process is described above for manufacturing a powdered metal assembly for use in a magnetic flux application, but bonded powdered metal parts may be used in a variety of applications, including those which may require sintering. Moreover, the powdered metal parts described herein may be hardened using other methods known in the art, including a variety of alternative heat treatment methods, steam treatments or impregnation with adhesives.

Figure 9:
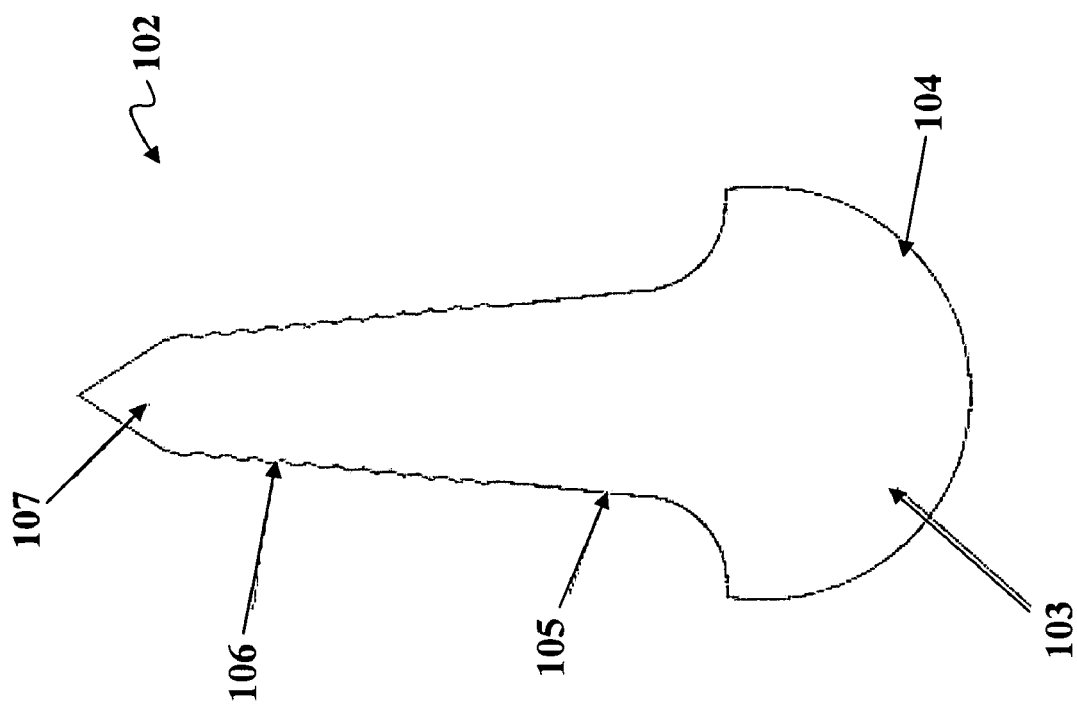
FIG. 9 illustrates the geometry of an exemplary powdered metal fastener in accordance with aspects of the present invention.

FIG. 9 illustrates an exemplary variation of a powdered metal fastener 102 that may be used in the process described above. The fastener 102 has a radiused head portion 103 at a first end that allows for tilting of the fastener 102 once set in place. The head portion 103 has a large head surface area 104 for distributing extreme force that may be exerted during the pressing process. A tapered body member 105 extends axially from the head portion 103 and may include undercut barbs 106 along the outer circumference along the length of the body member 105 that are angled for maximum holding strength. The tapered body member 105 may include a pointed distal end 107 designed to further minimize and distribute any force applied in the axial direction of body member 105 by the pressing process or the fastener install tool.

Figure 10:
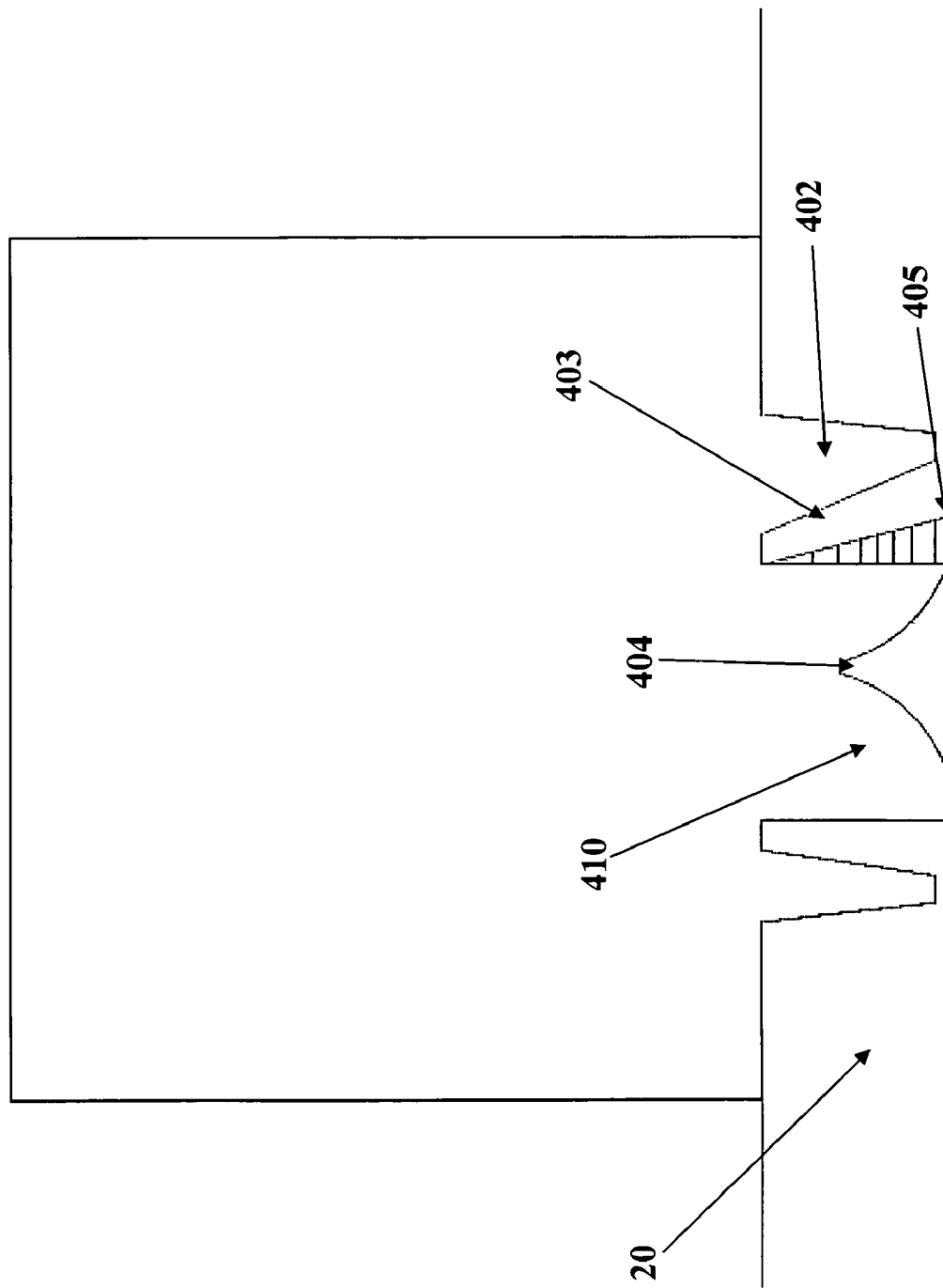
FIG. 10 shows an exemplary geometry for a machined pocket or cavity in a mechanical part for directly affixing a powdered metal part thereto without the use of fasteners in accordance with aspects of the present invention.

FIG. 10 illustrates another variation of a mechanical part 20 machined with a fastenerless pocket 410. The pocket 410 may be machined to include a wedged gap 402 and flange 403. The bottom surface of pocket 410 cylindrically ramps up from the base 405 of the flange 403 to a peak 404 in the center of the pocket 410. The peak 404 may be polished or coated with a material to enhance the flow of powdered metal toward the base 405 of the flange 403. In this manner, as the mechanical press exerts enormous pressure on the powdered metal, the powdered metal simultaneously drives into the wedge gap 402 and slides off of the peak 404. The pressure exerted in the wedge gap 402 causes the flange 403 to begin folding over. As this effect occurs, an undercut density shadow enhances the effect due to the lower density now underneath the flange 403 overhang. At the same time, the peak 403 drives the powdered metal material toward the base 405 of the flange 403, causing the base 405 to displace radially outward, further enhancing the fold-over action of the pressing process. The enhanced fold-over may be desirable in this variation, as there may be no possibility of damaging a fastener. The fold-over provides the mechanism for holding the formed powdered metal part directly to the mechanical part 20 without the need for a fastener.

Further, some aspects of these devices give rise to difficulties with manufacturing. For example, the mechanical part 20 may be comprised of a material that is brittle if bent, such as aluminum. In the case where material properties or other factors prevent machining or metal forming on the co-molded mechanical part 20, a fastener ideally matched to the powdered metal forming process may be installed with threads or barbs, for instance.

Figure 11:
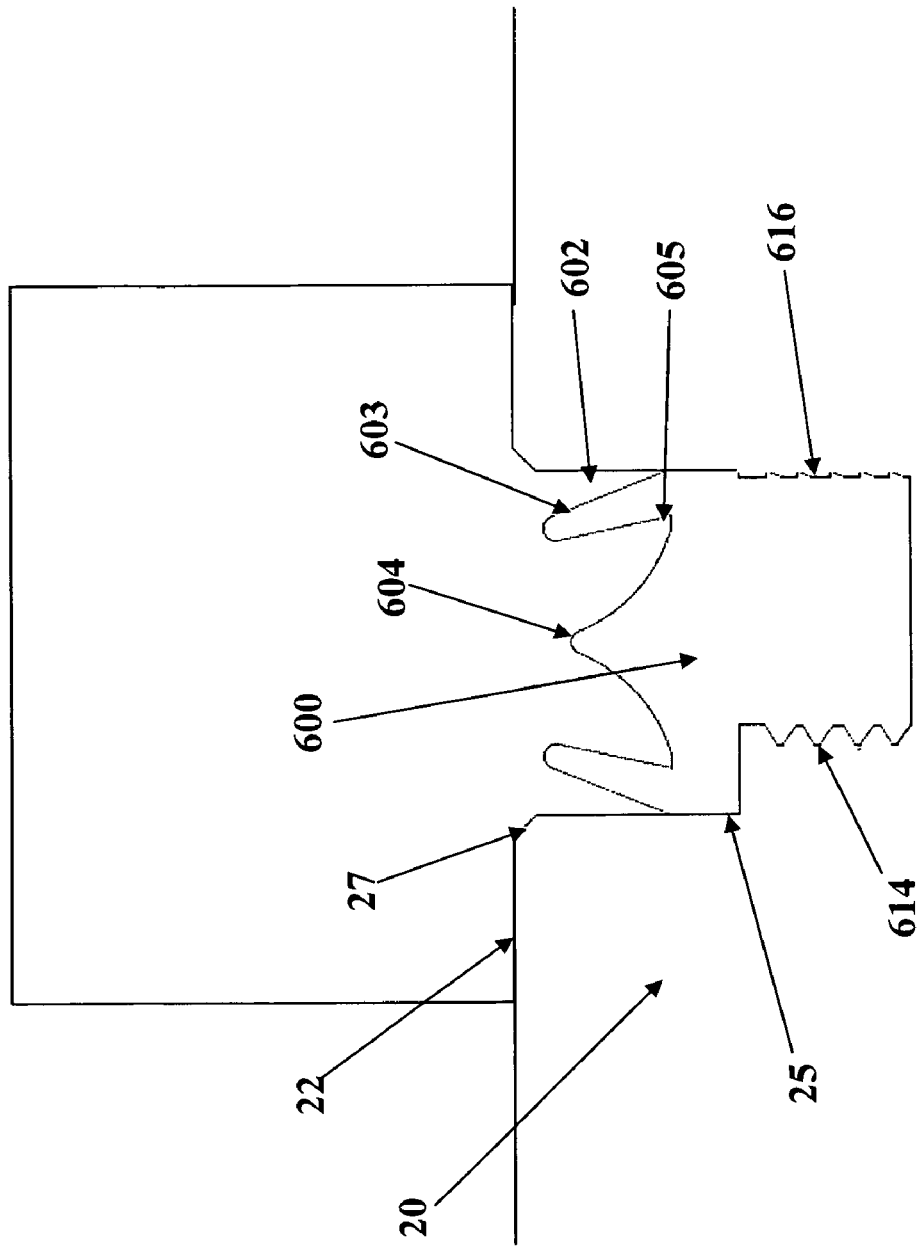
FIG. 11 illustrates the geometry of exemplary fasteners that may be used when machining or metal forming of the mechanical part prohibits the geometry shown in FIG. 10 in accordance with aspects of the present invention.

FIG. 11 illustrates an exemplary approach in which a fastening device 600 may engage a pre-machined bore 25 in the mechanical part 20. The bore 25 could be simply a hole of fixed diameter and depth. Threads 614 may be provided on an interior surface of the bore 25 for receiving a threaded fastening device 600, or the fastening device 600 may comprise directional barbs 616 for compression fitting into the bore 25. The fastening device 600 may be installed by a fastener install tool or by hand. Once installed, a form tool will operate in tandem with the mechanical part 20 to form a cavity into which a powdered metal may flow. A mechanical press may then apply high pressure to bondform the powdered metal particles into a powdered metal part.

As further shown in FIG. 11, the fastening device 600 may be machined to include a flange 603. The flange may be slightly bent radially inward to create a wedged gap 602 between the flange and an inner surface of the bore 25. A peak 604 that cylindrically ramps up from the inner base 605 of the flange 603 is provided in the fastening device 600. The peak 604 may be polished or coated with a material, such as uncured epoxy, which acts as a lubricant to enhance the flow of powdered metal toward the base 605 of the flange 603. In this manner, as the mechanical press exerts enormous pressure on the powdered metal, the powdered metal simultaneously drives into the wedge gap 602 and slides off of the peak 604. The pressure exerted in the wedge gap 602 causes the flange 603 to fold over further. As this occurs, the undercut density shadow increases, and the effect of the lower density underneath the flange 603 overhang enhances the fold over effect. At the same time, the peak 604 drives the powdered metal material toward the base 605 of the flange 603, causing the base 605 to displace radially outward, further enhancing the fold-over action of the pressing process. This operation may enhance the compression fit of the fastening device 600, due to the outward force applied against the walls of the bore 25. In this manner, the flanges 603 may act as a clamp on the packed powdered metal part, holding it in place and preventing it from disengaging from the mechanical part 20.

The fastening device 600 may be designed to completely fit into the bore 25. As shown in FIG. 11, the top of the flange 603 is situated below the shoulders 27 of an upper surface 22 of the mechanical part 20. Thus, the flux properties of the joined parts may be such that flux flows unimpeded over the top of the bore 25 through the powdered metal part. In this manner, the fastening device 600 may be comprised of almost any material, including titanium, copper or steel, for example. This configuration allows joining of a powdered metal part under high pressure to a mechanical part 20 that might have material properties that would otherwise prevent machining or direct co-molding, without losing the flux characteristics important in certain operating environments.

Figure 12:
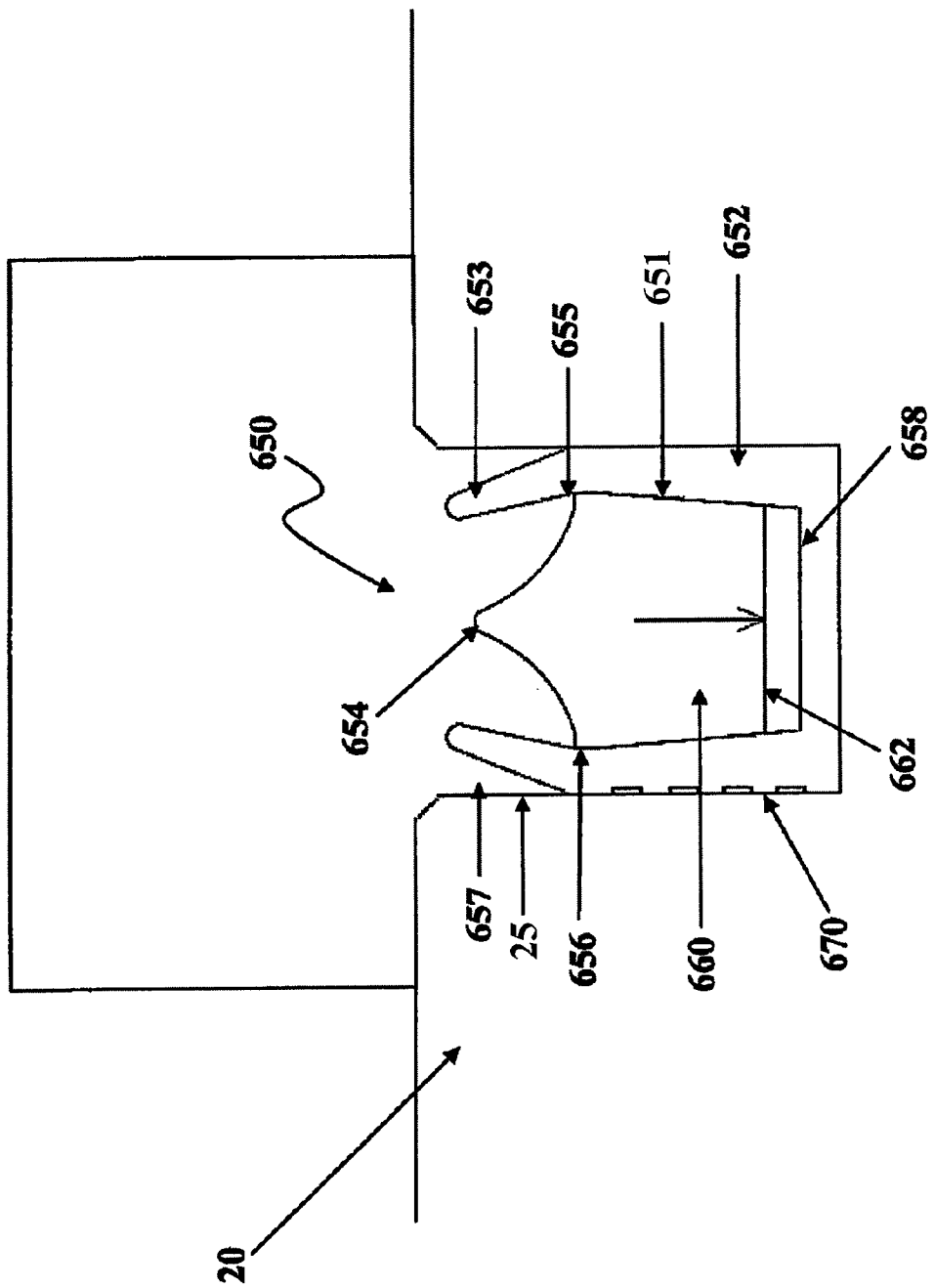
FIG. 12 shows an exemplary wedge fastener in accordance with aspects of the present invention.

FIG. 12 shows another variation of a fastening device. A "drop in" wedge fastener 650 may allow for easier hand installation of the fasteners without requiring a multi-step machining process. The fastener 650 may be pre-assembled and comprise an outer cylinder 652, for example, and a wedge 660. The outer cylinder 652 includes an inner bore 651 that is tapered so as to have a larger diameter in a shoulder area 656 than the inner end surface 658. The outer cylinder 652 further has an upper flange 653 that is bent radially inward over the upper surface of the wedge 660.

The tapered cylindrical wedge 660 is compression fit into the bore 651. The wedge has a lower surface 662 with diameter greater than the diameter of the inner end surface 658 and is tapered at a degree matching the taper of the outer cylinder 652. The wedge has an upper surface with a central rounded peak 654 that ramps down to the inner base 655 of the flange 653. Because the wedge 660 has a base of larger diameter in the upper direction, as shown in FIG. 12, the wedge does not completely slide down into the cylinder 652.

The configuration of the "drop-in" wedge fastener 650 may permit the flange rollover process described above to effectively bond a powdered metal part to the mechanical part. The wedge fastener 650 may also be made from material matched to the powdered metal properties for heat treatment so that it hardens and strengthens as well during a heat treatment process. In this manner, the wedge fastener 650 may be comprised of a more malleable material to facilitate the pressing process.

The pre-assembled "drop-in" fastener 650 may then be inserted into the pre-machined bore 25 of a mechanical part 20, for example. The force from the pressing operation drives the wedge 660 to a selected depth, causing a high magnitude press fit of the cylinder 652 against the bore 25. The flange gap 657 operates in tandem with peak 654 to produce the fold-over effect described above. But in this variation, the motion of the wedge 660 also increases the possible amount of flange 653 fold-over because the volume inside the cylinder 652 expands as the compaction of the wedge 660 occurs. The increasing volume thus reduces further the density of the powdered metal material under the flange 653 during the initial stages of the pressing process. The wedge 660 and cylinder 652 may be configured in various ways to increase or decrease the pressure of the fit, such as by varying the angle of the wedge 660, the depth of the bore 25, and the thickness, length and material properties of the flange 653. Controlling the rollover of the flange 653, such as within a few thousandths of an inch, may properly balance the mechanical undercut to permit for increased tensile strength of the powdered metal part. Furthermore, the exterior surface of the wedge 660 or cylinder 652 may be provided with ribs 670 for enhanced grip following the compaction process. The ribs 670 may also accommodate tolerances in the machining process by permitting material to compact in the direction of the air voids of the ribs if the bore is too tight, allowing full travel of the wedge.

Figure 13B:
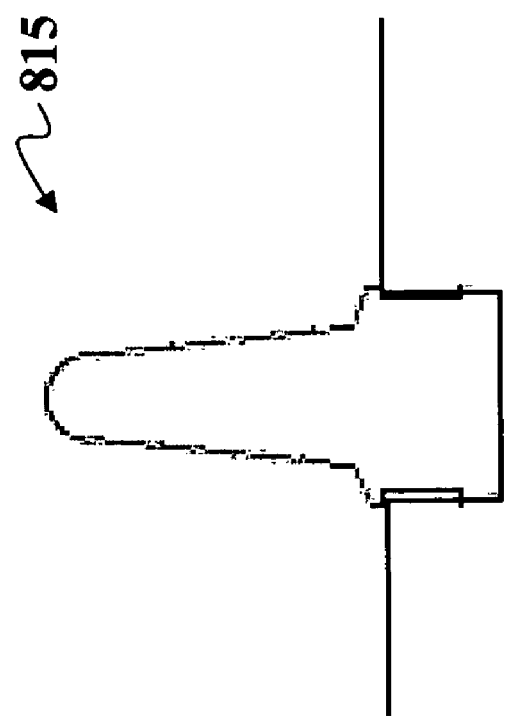
FIGS. 13A and 13B illustrate exemplary compression fit fasteners in accordance with aspects of the present invention.
Figure 13A:
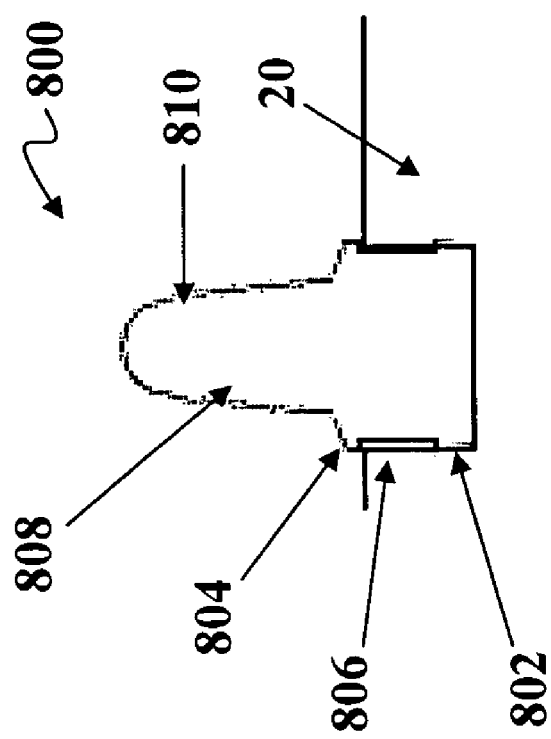

FIG. 13A illustrates another variation of a fastening device 800. The fastening device 800 has an insert section comprised of a press fit shoulder 802 and an upper shoulder 804 separated by a micro void area 806, and an upper tapered body member 808 with angled barbs 810 axially extending from the insert section. The pressing process in this variation causes material from the mechanical part 20 to roll into the micro void area, thus trapping the press fit shoulder 802. A tight bond is ensured between the powdered metal part and the mechanical part 20 by virtue of the secure fastening device 800. FIG. 13B illustrates a similar fastening device 815 with a slightly taller tapered body member.

FIG. 14A illustrates a dovetailed fastening device 820. The fastening device 820 is designed to fit into a machined slot 821 in the mechanical part 20. Once inserted into the slot 821, the shoulders 822 retain the fastening device 820 in place. The pressing process may further secure the fastening device 820 in the slot 821.

FIG. 14B shows another fastening device 830. The geometric features of the device 830 and the machined cavity create pockets 834 that work to retain the powdered metal part in place once the pressing process is complete.

FIG. 14C shows another fastening device 840 installed with the assistance of a support boss 50. The fastening device 840 has a dovetail section 842 that slidably enters the guide hole 844 via the support boss 50 until firmly seating against the shoulder 848. The pressing process forms the powdered metal part around the fastening device 840. The geometric features of the fastening device 840 are designed with aspects of the machined mechanical part 40, such as the lip 846, to further bind the parts together.

FIG. 15A shows a threaded fastening device 850 with a threaded base 851 that is screwed into a bore 852 in the mechanical part 20. The end 854 of the fastening device is bulbous in nature so that the pressing process packs the powdered metal around the head in all directions. In so doing, the powdered metal part may be prevented from detachment from the mechanical part 20 by the combination of the embedded end 854 and the threaded base 851.

FIG. 15B illustrates a fastening device 860 that includes a threaded base 861, a central body portion 862, and a tapered distal end 863. A stamped nut 864 is slidable over the taper end 863 so as to fit onto the central body portion 862. The nut 864 is free to move during the pressing process so that the density of the material will be uniform above and below. The nut 864 may work in combination with the threaded base 861 to join the powdered metal part to the mechanical part 20.

Figure 16B:
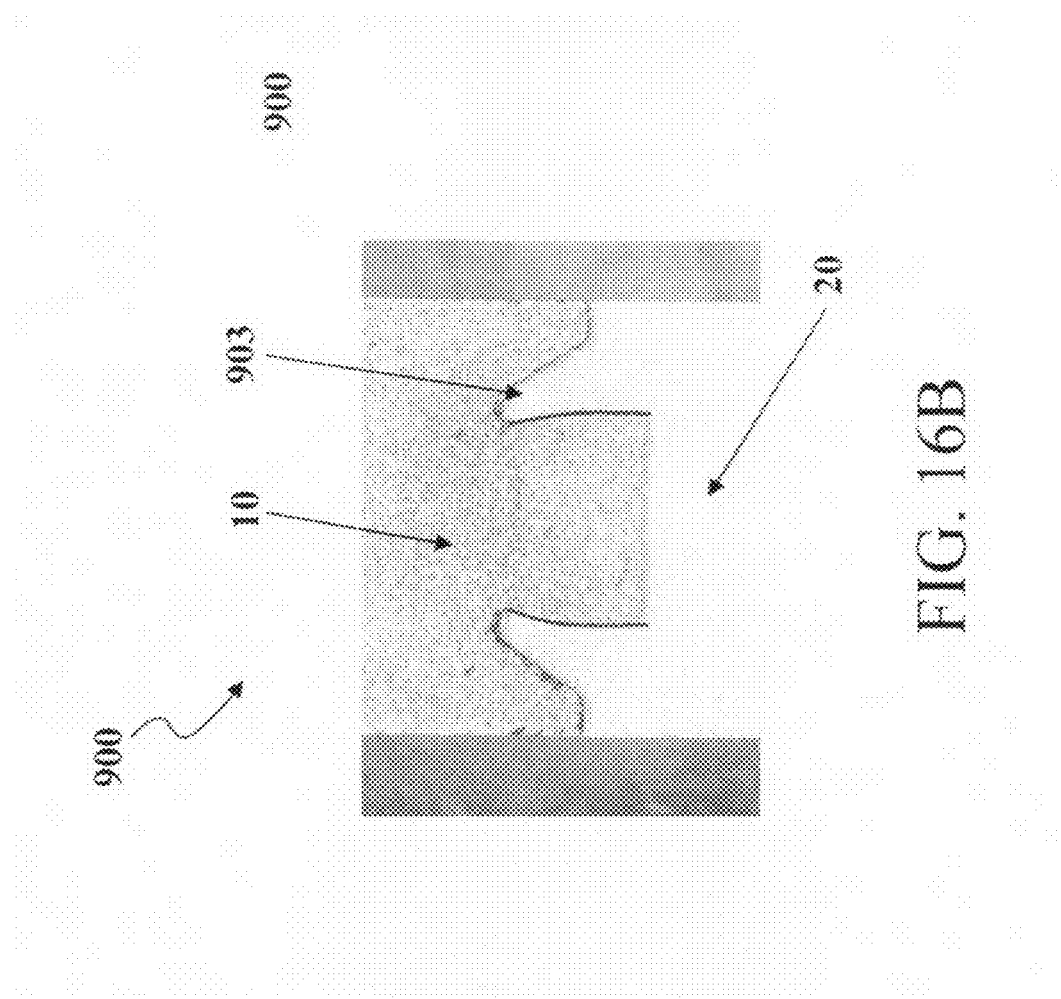
FIGS. 16A and 16B illustrate an exemplary variation of a powdered metal part bonded to a substrate in accordance with aspects of the present invention.
Figure 16A:
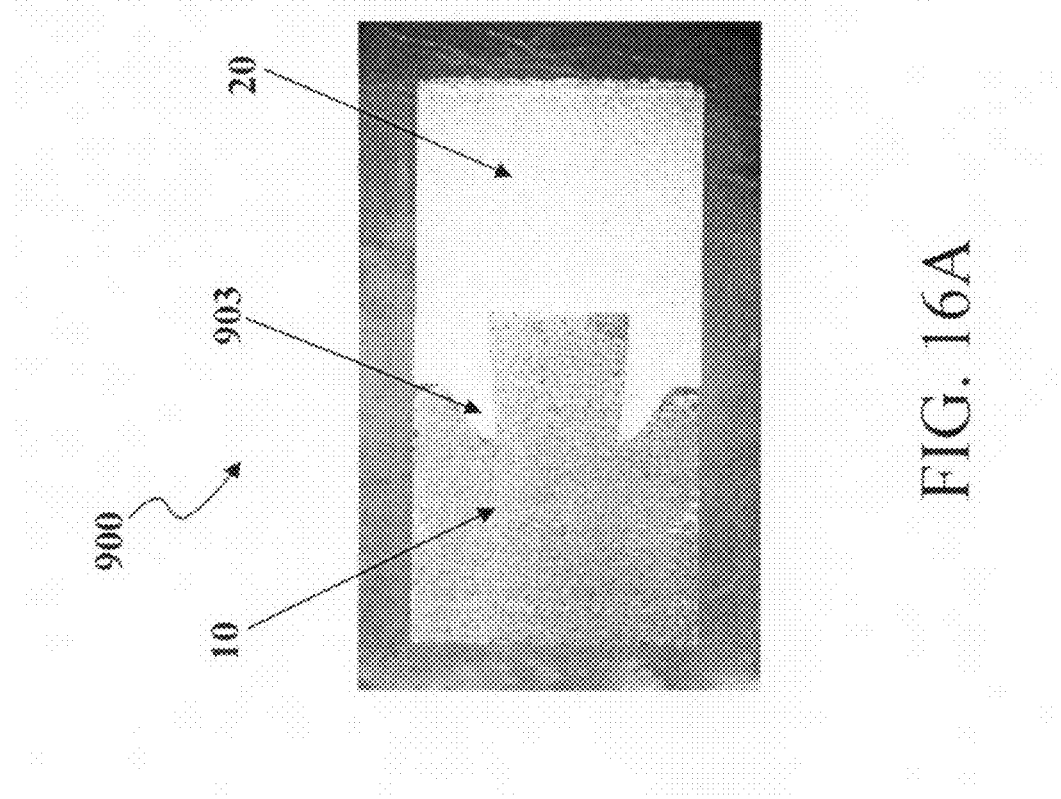

FIG. 16A illustrates a powdered metal assembly 900 manufactured according to the methods described herein. The powdered metal part 10 bonds to the mechanical part 20 through the pressing process of the powdered metal in a forming apparatus. The force of the pressing action during compaction of the powdered metal drives the flanges 903 inward toward the powdered metal part to mechanically hold the parts together, as illustrated in the enlarged picture of the prototype in FIG. 16B. The combination of the mechanical hold means and a glue bond, for example, may be used to further enhance the strength of the bond.

The places where the description above refers to particular implementations joining powdered metal parts to machined mechanical parts, it should be readily apparent that a number of modifications may be made without departing from the spirit thereof and that these aspects and implementations may be applied to other powdered metal parts joining machined mechanical parts. The presently disclosed aspects and implementations are therefore to be considered in all respects as illustrative and not restrictive.

What is claimed is:

1. A powdered metal assembly, comprising:
a mechanical part;
a powdered metal part; and
a fastener configured to join the mechanical part and the powdered metal part,
wherein the fastener is a powdered metal fastener comprising a body portion and an insertion portion,
wherein the mechanical part further comprises a cavity defined therein,
wherein an opening of the cavity opposes the powdered metal part,
wherein the powdered metal fastener is inserted in the cavity to join the mechanical part to the powdered metal part,
wherein the cavity comprises a threaded bore,
wherein the powdered metal fastener comprises a threaded portion for insertion into the threaded bore,
wherein the powdered metal fastener comprises a tapered distal end opposite the threaded portion, and
wherein the powdered metal assembly comprises a nut slidable over the tapered distal end and encompassing the body portion.

2. A powdered metal assembly, comprising:
a mechanical part,
a powdered metal part; and
a fastener configured to join the mechanical part and the powdered metal part,
wherein the fastener is a powdered metal fastener comprising a body portion and an insertion portion,
wherein the mechanical part further comprises a cavity defined therein,
wherein an opening of the cavity opposes the powdered metal part,
wherein the powdered metal fastener is inserted in the cavity to join the mechanical part to the powdered metal part, and
wherein the powdered metal fastener comprises an outer cylinder with an inner bore that is tapered to accept a wedge inserted therein.

3. The powdered metal assembly of claim 2, wherein the outer cylinder further comprises an upper flange bent radially inward toward an upper surface of the wedge.

4. The powdered metal assembly of claim 3, wherein the wedge comprises a lower surface with a diameter greater than the diameter of an inner lower surface of the inner bore.

5. The powdered metal assembly of claim 4, wherein the wedge comprises a peak in an upper surface that slopes to an axial insertion end of the fastener.

6. A powdered metal assembly, comprising:
a mechanical part;
a powdered metal part; and
a fastener configured to join the mechanical part and the powdered metal part,
wherein the fastener is a powdered metal fastener comprising a body portion and an insertion portion,
wherein the mechanical part further comprises a cavity defined therein,
wherein an opening of the cavity opposes the powdered metal part,
wherein the powdered metal fastener is inserted in the cavity to join the mechanical part to the powdered metal part, and
wherein the powdered metal fastener comprises two shoulders separated by a void area defined therebetween.

7. A powdered metal assembly, comprising:
a mechanical part;
a powdered metal part; and
a fastener configured to join the mechanical part and the powdered metal part,
wherein the fastener is a powdered metal fastener comprising a body portion and an insertion portion,
wherein the mechanical part further comprises a cavity defined therein,
wherein an opening of the cavity opposes the powdered metal part,
wherein the powdered metal fastener is inserted in the cavity to join the mechanical part to the powdered metal part, and
wherein the mechanical part comprises a slot for slidably inserting a base portion of the powdered metal fastener.

8. The powdered metal assembly of claim 7, wherein the mechanical part further comprises shoulders for seating the base portion of the powdered metal fastener.

9. A powdered metal assembly, comprising:
a mechanical part;
a powdered metal part; and
a fastener configured to join the mechanical part and the powdered metal part,
wherein the fastener is integral with the mechanical part,
wherein the mechanical part further comprises a cavity defined therein,
wherein an opening of the cavity opposes the powdered metal part, and
wherein a flange extends from a lower surface of the cavity toward the powdered metal part.

10. The powdered metal assembly of claim 9, wherein the lower surface of the cavity radially slopes from a peak to a base portion of the flange.

* * * * *